US009369430B2

United States Patent
Dahlin et al.

(10) Patent No.: US 9,369,430 B2
(45) Date of Patent: Jun. 14, 2016

(54) METHOD AND ARRANGEMENT FOR ALLOWING ENTERPRISE AND PERSONAL DOMAINS IN THE IMS

(75) Inventors: Steinar Dahlin, Järfälla (SE); Anders Ryde, Saltsjöbaden (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1355 days.

(21) Appl. No.: 12/527,473

(22) PCT Filed: Feb. 16, 2007

(86) PCT No.: PCT/SE2007/050091
§ 371 (c)(1), (2), (4) Date: Aug. 17, 2009

(87) PCT Pub. No.: WO2008/100190
PCT Pub. Date: Aug. 21, 2008

(65) Prior Publication Data
US 2010/0118860 A1 May 13, 2010

(51) Int. Cl.
*H04L 12/66* (2006.01)
*H04L 29/12* (2006.01)
*H04L 29/06* (2006.01)

(52) U.S. Cl.
CPC ...... *H04L 61/2596* (2013.01); *H04L 29/12584* (2013.01); *H04L 29/12066* (2013.01); *H04L 61/1511* (2013.01); *H04L 65/1016* (2013.01); *H04L 65/1073* (2013.01)

(58) Field of Classification Search
None
See application file for complete search history.

(56) References Cited

U.S. PATENT DOCUMENTS

| | | | | |
|---|---|---|---|---|
| 6,212,372 | B1 * | 4/2001 | Julin | 455/418 |
| 7,987,251 | B2 * | 7/2011 | Blinn et al. | 709/223 |
| 8,059,633 | B2 | 11/2011 | Heidermark et al. | |
| 2004/0193920 | A1 * | 9/2004 | Kiss et al. | 713/201 |
| 2004/0196796 | A1 * | 10/2004 | Bajko et al. | 370/310 |
| 2007/0121890 | A1 * | 5/2007 | Li et al. | 379/221.13 |
| 2008/0070543 | A1 * | 3/2008 | Matuszewski et al. | 455/404.1 |
| 2008/0101582 | A1 * | 5/2008 | Hua et al. | 379/220.01 |

FOREIGN PATENT DOCUMENTS

| | | | |
|---|---|---|---|
| WO | 2006125474 | A1 | 11/2006 |
| WO | WO2006114133 | A1 | 11/2006 |

OTHER PUBLICATIONS

"3rd Generation Partnership Project; Technical Specification Group Core Network and Terminals; IP Multimedia (IM) Subsystem Cx and Dx interfaces; Signalling flows and message contents (Release 7)," 3GPP TS 29.228 V7.4.0, XP003019412 (Dec. 2006), pp. 1-59.

(Continued)

*Primary Examiner* — Otis L Thompson, Jr.
(74) *Attorney, Agent, or Firm* — Patent Portfolio Builders, PLLC

(57) ABSTRACT

The present invention relates to a method and an arrangement for allowing private domains in the IMS, which makes it possible to use a SIP URI like ID@private-domain.TLD. This is achieved by providing an administration support and an interface to the IMS interconnect DNS and the DNS system of the operator network. The identity associated with private domain is established as a Private domain name based IMPU. The private domain name based IMPU and the Operator domain name based IMPU is associated by using the implicit registered identity set provided by the IMS.

16 Claims, 6 Drawing Sheets

(56) References Cited

OTHER PUBLICATIONS

Chinese Office Action received in application No. 200780051329.9 mailed Apr. 4, 2014. English Translation Submitted.
Chinese Office Action received in application No. 200780051329.9 mailed Sep. 3, 2013. English Translation Submitted.
Chinese Office Action received in application No. 200780051329.9 mailed Jan. 29, 2013. English Translation Submitted.
Chinese Office Action received in application No. 200780051329.9 mailed Apr. 25, 2012. English Translation Submitted.
Jennings, C. et al. "Private Extensions to the Session Initiation Protocol (SIP) for Asserted Identity within Trusted Networks," XP015009093, (Nov. 2002), pp. 1-16.

* cited by examiner

Fig. 4a
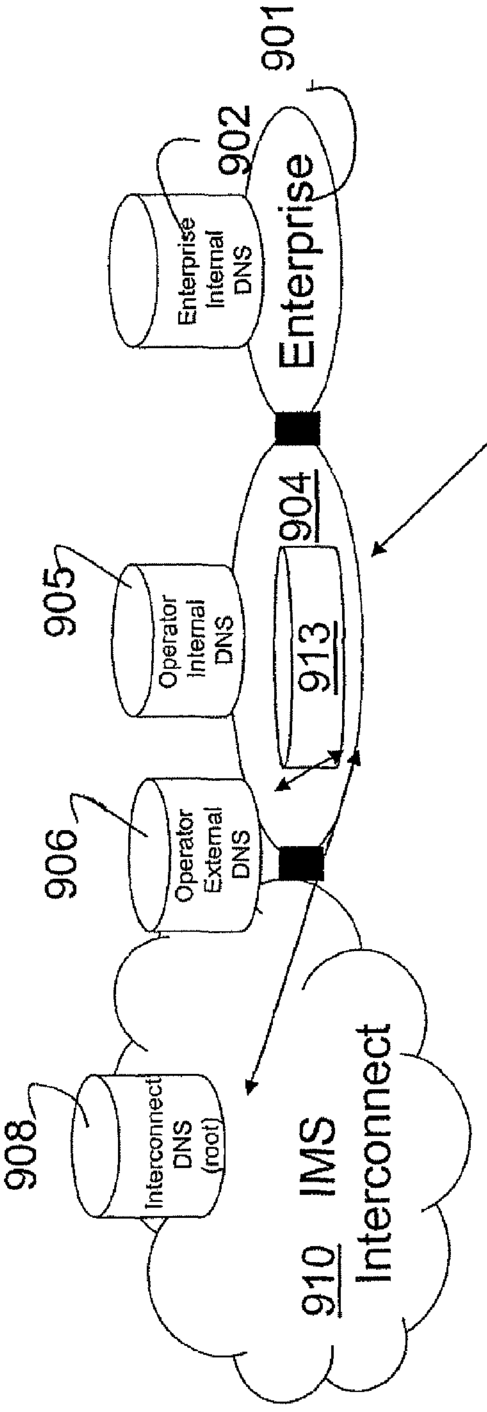
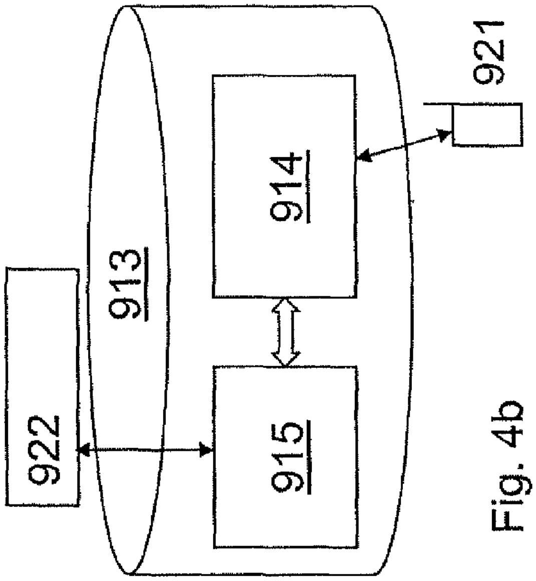
Fig. 4b
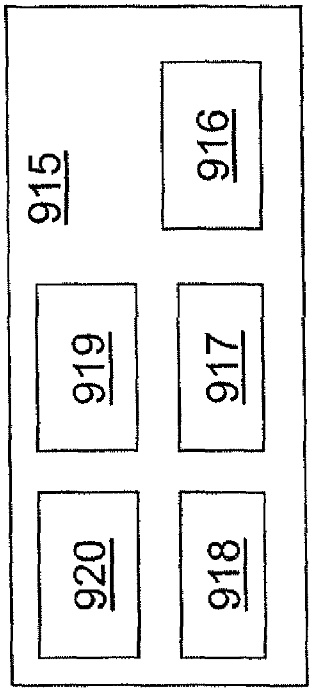
Fig. 4c

METHOD AND ARRANGEMENT FOR ALLOWING ENTERPRISE AND PERSONAL DOMAINS IN THE IMS

TECHNICAL FIELD

The present invention relates to methods and arrangements in an IP Multimedia Subsystem (IMS) and in particular to methods and arrangements for allowing enterprise and personal domains in the IMS.

BACKGROUND

The present invention relates to methods in an IP (Internet Protocol) Multimedia Subsystem (IMS) which is a standardised architecture for telecom operators that want to provide mobile and fixed multimedia services. It uses a Voice-over-IP (VoIP) implementation based on a 3GPP standardised implementation of SIP, and runs over the standard Internet Protocol (IP). Existing phone systems, both packet-switched and circuit-switched, are supported.

The IMS services are provided by a number of IMS operators in co-operation. This is illustrated by op1 120*a* to op6 120*f* in FIG. 1. These IMS operators op1-op6 120*a-f* are interconnected through a closed interconnect/transit structure 100, an example of such an interconnect network is the by GSM Association proposed IP Exchange or IPX network provided by a set of IPX operators IPX1-IPX3 130*a-c*. In case of using IPX the IMS operators are connected to a few IPX operators while all IPX operators are interconnected making sure that between any two IMS operators there is at most two IPX operators. The IPX structure 130*a-c* constitutes an IMS transit layer on top of the GRX network 100.

The structures of the IMS interconnect DNS databases are as distributed as the Internet Domain Name System (DNS) database; all operators operate and administrate the internal structure of the domains they are responsible for. Only the top level services are present on the GRX network, they in turn point at the different operators DNS:es.

In the IMS, the additional identities IP Multimedia Private Identity (IMPI) and the IP Multimedia Public Identity (IMPU) are used to identify the user. The IMPI and the IMPU is a URI such like a phone number comprising digits or a SIP-URI comprising alphanumeric identifiers like "jan.svensson@operator.com".

The IMPI is a unique identity normally stored at the ISIM that is used when registering a user in the IMS system and it is possible to have multiple IMPUs per IMPI. The IMPU can also be shared with another phone, so both can be reached with the same identity (for example, a single phone-number for an entire family).

A user can have several Public Identities (IMPUs) that can be used in different situations. They can be seen as aliases so that the alternative IMPU "the plumber" can be used instead of the more formal IMPU "jan.svensson" if selected by the user. Then, Jan Svensson will also when chosen be known as "the plumber" in the network. If another user wants to initiate a sip-call to Jan Svensson, in his role of "the plumber", he ca can be reached on the address "the plumber@operator.com".

If a user has several IMPUs they can be coupled together in implicit registered Id sets, meaning that when a user register with one of the IMPUs in the implicit registered Id set, the other IMPUs in the implicit registered Id set will also be registered The identities IMPU, IMPI, IMSI, and MSISDN are stored in the HSS (Home Subscriber Server) 204 shown in FIG. 2 that is the master user database supporting the IMS network entities that are actually handling the calls/sessions. Further, the HSS contains the subscription-related information (user profiles), performs authentication and authorization of the user, and can provide information about the physical location of user. When multiple HSSs are used, an SLF (Subscriber Location Function) 212 is needed to map user addresses.

An IMS 200 connected to an access network 202, to other IMS operators e.g. via an IPX system 211 and to a PSTN (Public switched telephone network) 213 via Media Gateway functions 214 is illustrated in FIG. 2. An IMS user 201 connects to the IMS 200 via an access network 202.

The IMS network comprises a plurality of SIP servers and SIP proxies called CSCF (Call Session Control Function), used to process the SIP signaling packets in the IMS.

A P-CSCF (Proxy-CSCF) 203 is a SIP proxy that is the first point of contact for the IMS terminal.

An I-CSCF (Interrogating-CSCF) 208 is a SIP proxy located at the edge of an administrative domain. Its IP address is published in the DNS of the domain, so that remote servers (e.g., a P-CSCF in a visited domain, or a S-CSCF in a foreign domain) can find it, and use it as an entry point for all SIP packets to this domain. The I-CSCF queries the HSS to retrieve the user location, and then routes the SIP request to its assigned S-CSCF.

An S-CSCF (Serving-CSCF) 205 is the central node of the signaling plane. The S-CSCF downloads and uploads user profiles from the HSS since it has no local storage of the user.

Application servers (AS) 206 host and execute services, and interface with the S-CSCF using SIP. This allows third party providers an easy integration and deployment of their value added services to the IMS infrastructure.

An MRF (Media Resource Function) 207 provides a source of media in the home network. It is e.g. used for multimedia conferencing.

The I-BGF 210 is the border gateway function that is controlled by the I-BCF 209.

Users of IMS are allocated at least one Public User Identifier, referred to as IMPU above, of the address type SIP URI when they become IMS users. This has one identity part and one domain part. The domain name part is today always one of the domain names of the operator managing the user, thus taking the form ID1@op2.com or ID2@op5.com as indicated in FIG. 1. These identities can also be E164 numbers falling back to traditional telephony identifications in combination with domain names. The identities can also be aliases. I.e. ID1 may be replaced with All being an alias selected by the user ID1. The identities used are the one that the users want to publish and make known as their visible (by humans in end-points) IMS identities.

When the user ID1@op2.com wants to establish a session with the user ID2@op5.com the target address (ID2 or an alias) are put into the "To" field of the SIP invite signal. This Public User Identity is also populated in the "Request URI" field to be used in the SIP routing algorithms for example between the originating S-CSCF and the terminating I-CSCF in the involved IMS systems. The originating users identity ID1@op2.com is entered into the "From" field of the invite to provide a routable return address, and possible also a presentable identity of the calling party to the called party.

Further, as stated above the SIP URI is built up of one individual part and one domain part defining the provider for the individual identity, ID@operator-domain.TLD, (TLD=Top level Domain on the Internet, e.g. corn) just like email addresses.

In the IMS standard it is assumed that the domain part actually points at the domain of the operator/provider and nothing else. This forms a problem for individuals and organizations that do not want to publish themselves as hosted by a provider but wants to be addressed through their private or their organizational domains.

One group is those that want their SIP URI to be like ID@private-domain.TLD, thus no operator/provider domain is present in that SIP URI.

Another group is organizations that want their SIP URI to reflect their organization rather that their provider domain like employee@enterprise-domain.TLD or member@organisation-domain.TLD, which implies that there is no operator/provider domain present in that SIP URI.

The IMS Standard has not shown how this can be achieved as of today. In all examples the provider domain is necessary for the communication between the functional entities inside each IMS provider's network implementation.

SUMMARY

Thus an object of the present invention is to achieve a method and arrangement for allowing private and enterprise domains in the IMS, which makes it possible to use a SIP URI like ID@private-domain.TLD.

According to a first aspect the object is achieved by the arrangement for an Internet Multimedia Subsystem (IMS) configured to receive a message from a user wherein the user is identified with an operator domain name based identity. The arrangement comprises means for receiving a selected private domain name based identity of the user, preferably in a P-Preferred identity header and storing means configured to store an implicit registered identity set of the user. The implicit registered set comprises the operator domain name based identity and the received selected private domain name based identity such that the received selected private domain name based identity can be coupled to the operator domain name based identity.

According to a second aspect of the present invention the object is achieved by a User Equipment (UE) connectable to an Internet Multimedia Subsystem. The UE comprises a selector making it possible to select a private domain name based identity from a pluralities of identities of an implicit registered identity set of a user of the UE and means for transmitting the selected private domain name based identity to a node of the IMS. The selector may be configured to make it possible for the user to select the private domain name based identity or configured to automatically select the private domain name based identity e.g. based on the communicating party. The selected private domain name based identity may be populated in the P-preferred identity header.

According to a third aspect the object is achieved by a method for an IMS comprising the step of receiving a message from a user wherein the user is identified with an operator domain name based identity. The method further comprises the steps of storing an implicit registered identity set of the user and receiving a selected private domain name based identity of the user. The implicit registered set comprises the operator domain name based identity and the received selected private domain name based identity such that the received selected private domain name based identity can be coupled to the operator domain name based identity. Preferably, the method comprises in addition the step of populating a P-Asserted identity header with the selected private domain name based identity received in the P-preferred identity header.

According to a fourth aspect the object is achieved by a method for a UE connectable to an IMS. The method comprises the steps of making it possible to select a private domain name based identity from a pluralities of identities of an implicit registered identity set of a user of the UE and transmitting the selected private domain name based identity to a node of the IMS. The selected private domain name based identity is preferably populated in the P-preferred identity header.

The advantage with the present invention is that it removes to need for users to publish themselves as users of a particular operator, since the users are able to establish an own private domain. It enables the use of any Internet domain within the IMS system. Enabling personal domains also enables that users can keep there personal identity while changing IMS operator. A user that has subscribed to the domain administration can keep that while all users of the domain are IMS users with other IMS operators and decide to change domain administrator as well.

A further advantage is that the coupling between the private domain based IMPU and the operator domain name based IMPU is achieved by using the existing mechanism of IMS implicit registered identity set.

BRIEF DESCRIPTION OF THE DRAWINGS

The invention, together with further objects and advantages thereof, may best be understood by making reference to the following description taken together with the accompanying drawings, in which:

FIG. 4*a-c* illustrate schematically an arrangement allowing private domain name based IMPUs.

DETAILED DESCRIPTION

Figure 1:
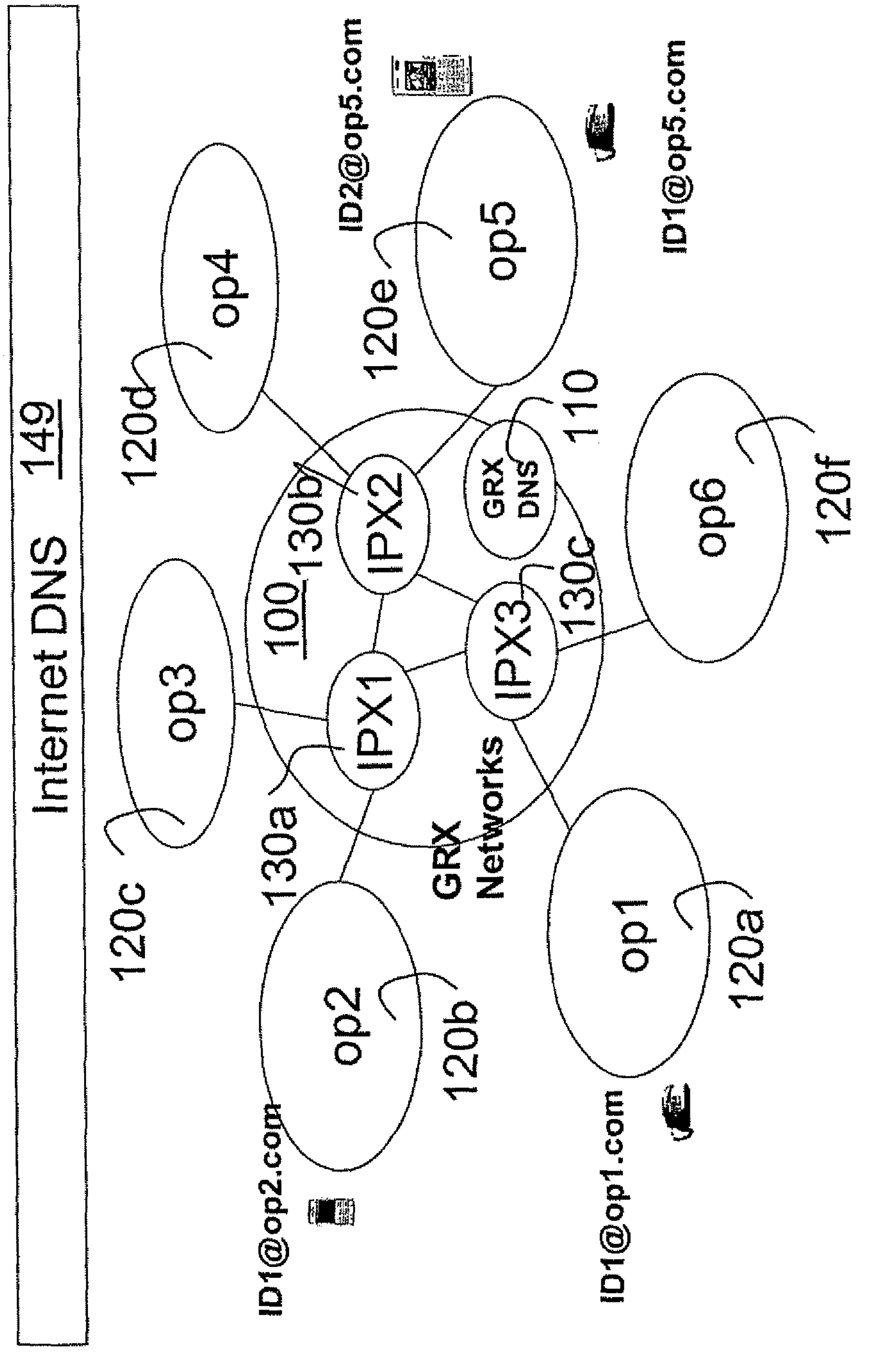
FIG. 1 illustrates a domain/provider structure in an IMS according to prior art.

The aim of the present invention is to make it possible to allow private domains in the IMS, which makes it possible to use a SIP URI like ID@private-domain.TLD. It should be noted that the private domain may be an enterprise domain such as enterprise.net.

An arrangement 913 allowing private domains in IMS is illustrated in FIG. 4*a* when implemented in an operator network 904. The operator network 904 comprises an internal DNS 905 and an external DNS 906 and provides an IMS service to the users 921 of the operator network 904 by means of an IMS interconnect network 910. The IMS interconnect network 910 comprises an IMS interconnect DNS 908. By using the arrangement 913 a private domain 901 (illustrated by an enterprise domain in FIG. 4*a*) may be requested. The private domain 901 may comprise an internal DNS 902.

FIG. 4*b* illustrates the arrangement 913 comprising an interface 914 for the user 921 of the operator network 904 requesting the enterprise domain 901. By means of the interface 914, the user 921 may access an administration support 915. The administration support 915 makes it possible for the user 921 to manage the DNS system 922, i.e. the DNSs of the operator network and of the IMS interconnect. The DNSs of the operator network comprises the external and internal DNS of the operator network and possibly the internal DNS of the private network. The administration support is illustrated in FIG. 4*c* and comprises means for establishing a private domain 916, e.g. en5.net, means for connecting 917 an IMS user as a member of the private domain by providing the IMS user to be connected an identity en5-id 1@en5.net associated with the private domain en5.net, means 918 for inserting the requested private domain en5.net at least in the IMS interconnect DNS and the external operator DNS, means 919 for inserting the connected members in the DNS system 922 of the operator network such that queries relating to IMS users being members of the private domain are forwarded to the external DNS of the first operator network, and means 920 for establishing the identity en5-id1@en5.net associated with private domain as an alias, i.e. the Private domain name based IMPU associated to the IMS identity of the connected user in the IMS interconnect network.

The arrangement, as illustrated by FIG. 4*a*, may be configured to be implemented in nodes in the first operator network, wherein the first operator is the operator that is responsible for the requested private domain. The arrangement may also be configured to communicate with the IMS interconnect DNS and preferably also with the DNS structure of the operator network shown in FIG. 4*a* and with the DNS structure of other operator networks. A user of the operator network being responsible for the private domain, i.e. the administrator of the private domain, may access the arrangement of the present invention by a computer via a web interface.

By using the above described arrangement, an operator is able to provide a new "private IMS domain hosting" service that enables end-users and enterprises to host their private domain name based IMS domains e.g. enterprise.net together with a Private domain name based IMPU" management service that couples the private domain name based identities to an operator based identity such as operator.com.

The private domain name based identity, also referred to as private domain name based IMPU, and the operator domain name based identity, also referred to as the operator domain name based IMPU, must be coupled in order to be able to route Registration messages to the operator IMS registrar function from a UE (and user). The UE is identified by the private domain name based identity while the routing is based on the operator domain. Furthermore, the routing based on the private domain name based identity request URIs between the origination and the terminating side must be handled in the operator network.

Thus, according to the present invention the private domain name based identity is coupled to the operator domain name based identity by using the IMS mechanism implicit registered set. The implicit registered set is a standardized IMS mechanism described in 3GPP TS 29.228 that allows a plurality of public identities to be grouped together. The relationships between the public identities and the private identities are maintained in the subscriber data in the HSS, and are parts of the user data that are provisioned into the IMS system as normal provisioning. As part of the standardized registration procedure all the identities in the implicit registered identity set is being stored in the P-CSCF during the registration. The mechanism provides a binding between the involved identities so that the other identities are implicitly registered when one of the public identities of the implicit registered set is registered. In the IMS standard this mechanism is used to create a binding between different operator owned public identities in different address formats e.g. tel:+123456789 and SIP:john.doe@operator.com. According to the present invention, this mechanism is being used to bind the operator domain name based identity and the private domain name based identity together. That implies that if the operator domain name based identity and the private domain name based identity belong to the same implicit registered identity set, the operator domain name based identity is implicitly known if the private domain name based identity is known, and the other way around.

Figure 3:
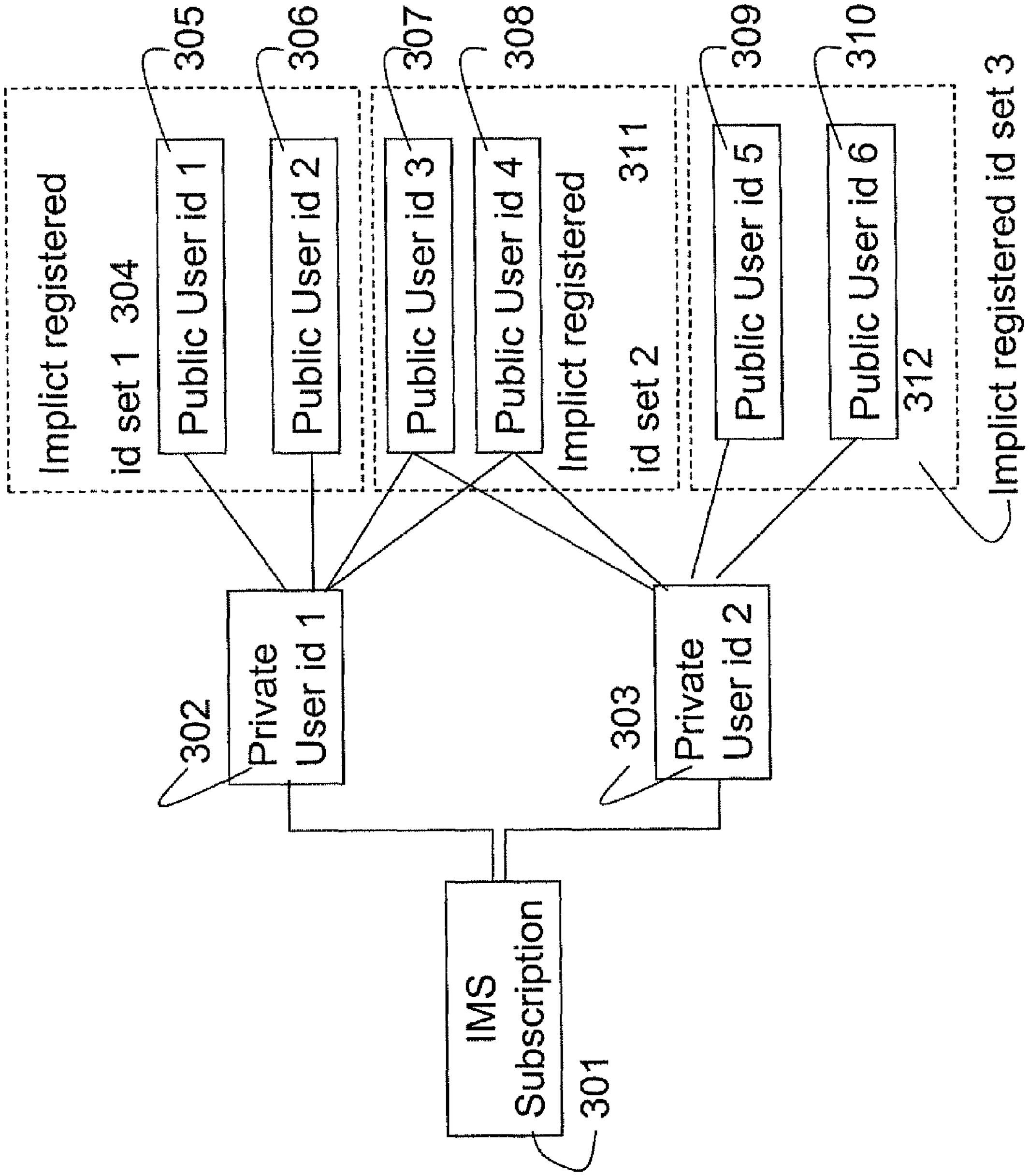
FIG. 3 illustrates schematically the public user identities in implicit registered identity sets.

According to the present invention, the registered public identities of one user (IMS subscription) 301 constitutes one or more implicit registered identity set 304, 311; 312 and the implicit registered identity set is stored in the P-CSCF. One private user identity 302, 303 may be associated with one or more public user identities 305-310 of one or more implicit registered identity sets 304, 311, 312 as illustrated in FIG. 3. Each implicit registered identity set comprises a plurality public user identities 305-310. The private user identity is used to identify the user to the network and is hence used for authentication.

The terminal and the IMS network are required to handle a plurality of public identities such as a plurality private domain name based identities and a plurality of operator domain name based identities whereby each private domain name based identity is associated with an operator domain name based identity. Further, the terminal should also allow the user to select one of the plurality of public identities to be used for a particular IMS based communication (session based or sessionless). The selected public identity may be dependent on the called or calling party.

The user of a UE registers to the operator IMS by using the operator provided request URI to the operators IMS registrar. The registration procedure create route and path headers for usage in session setup. The private domain name based IMPU is then associated to the operator domain name based IMPU via the mechanism of the implicit registered identity set. Hence the implicit registered identity set contains both the operator domain name based IMPU and the private domain name based IMPU, which implies as stated above that the operator domain name based IMPU for a user may be identified via the private domain name based IMPU.

The public identity (IMPU) that is part of the implicit registered identity set that the user wants to identify himself with for other users is according to the present invention a private domain name based IMPU. Hence the user selects the identity to be used for a particular IMS communication, i.e. one private domain based identity. The UE then uses the selected private domain name based IMPU as the P-preferred identity. The P-preferred identity header is defined in the IMS as a means for a user/UE to instruct the P-PSCF on which public user identity to use for a particular communication selected from an implicit registered identity set.

The general mechanism for use of P-Preferred Identity and P-Asserted Identity is described in RFC 3325 and the use thereof in IMS is described in 3GPP TS 24.228 and TS 24.229 (sect 5.2)

As stated above, the identity that the user want to use for a particular session is the identity populated in the P-preferred identity header by the UE. The identity of the P-Preferred identity header is selected as the P-Asserted identity by the P-CSCF when it receives a UE initiated IMS communication request including a P-Preferred Identity that is part of the implicit registered identity set. In this case the P-preferred identity (i.e. the private domain name based IMPU) is then put, by the P-CSCF, in the P-asserted identity header. Thus, the P-Asserted identity header carries an IMPU that the operator handling the user has authenticated and is accountable for within the operator community trust domain, which implies that an embodiment of the present invention comprises means for making the private domain name based identity into a trusted identity.

According to the present invention the UE needs to populate with the same private domain name based IPMU in the "From:" field as it populates in the P-Preferred Identity header. Therefore, the operator internal DNS is populated with relevant entries for the private domain name based IMPU handled by the operator such that routing is managed from originating S-CSCF to terminating I-CSCF based on private domain name IMPU in the request URI.

The process of using the implicit registered set for the coupling between the private domain name based IMPU and the operator domain name based IMPU will now be described.

A prerequisite for the procedure is that IPMUs in HSS including private domain name IMPUs and their relationship with their operator domain name based IMPUs in the implicit registered identity sets must be provisioned. A further prerequisite is that the operator internal DNS must be provisioned with relevant entries for the private domain name IMPUs so that routing from originating S-CSCF to terminating I-CSCF based on private domain name based identities is handled correctly.

1. The user and the UE register in the IMS.

2. The IMPUs of the implicit registered identity set is fetched from the HSS via the S-CSCF and stored in the P-CSCF.

Communication Establishment:

3. The user selects which IMPU (one of the private domain name based or an operator owned IMPU) to be used in the UE (as configuration or per communication request). The implicit registered identity set is either stored in the UE or populated from the network.

4. Upon IMS Communication establishment i.e. when sending INVITE or other initial SIP transactions, the UE populates the chosen IMPU in the P-Preferred Identity header and sends the SIP message to P-CSCF. Furthermore the From: field is populated with the same chosen IMPU.

5. When the P-CSCF receives a UE initiated IMS communication request including a P-Asserted Identity Header and the IMPU carried in that header is one of the IMPUs in the implicit registered identity set then the P-CSCF populates the P-asserted identity header with the preferred IMPU.

Figure 2:
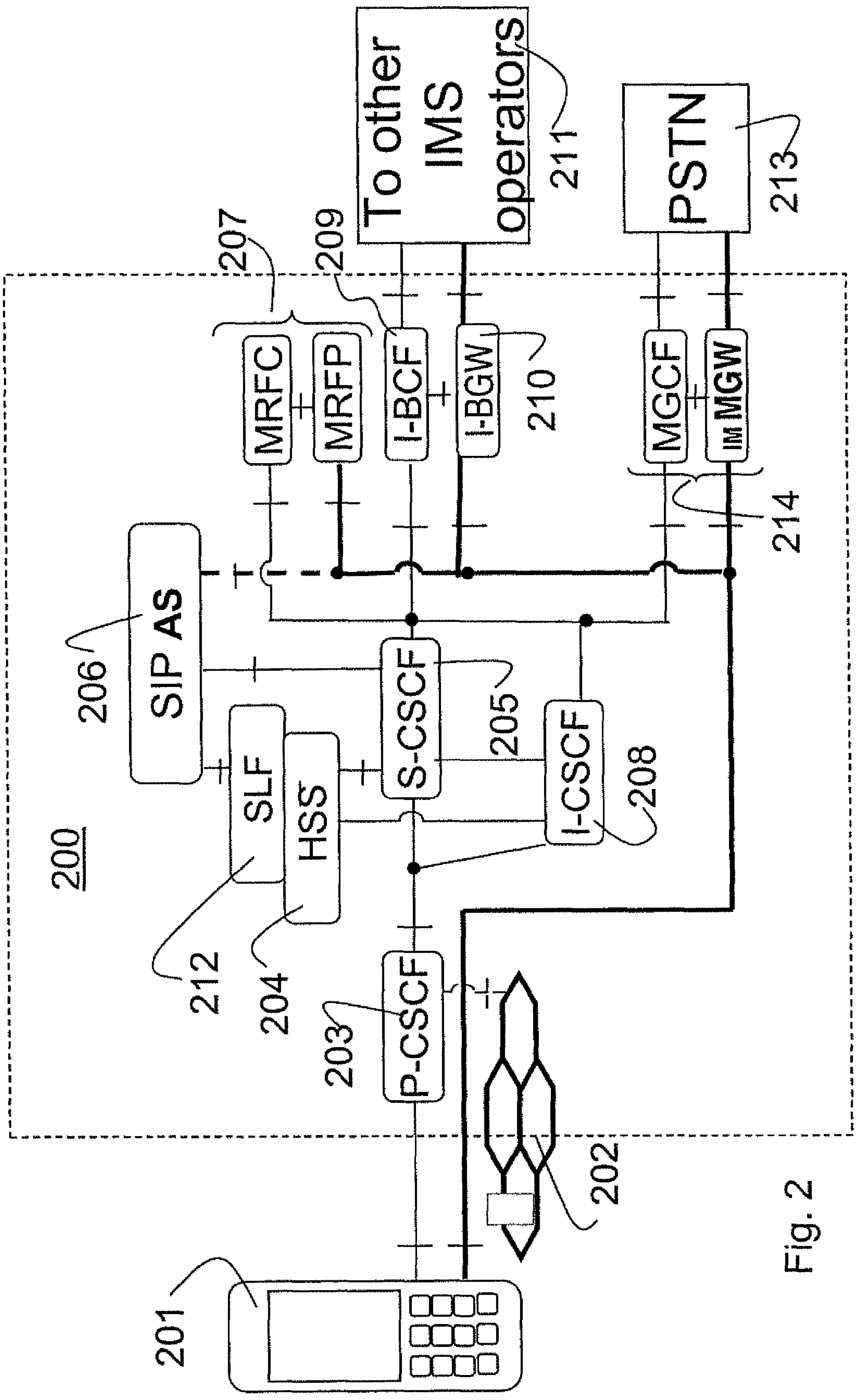
FIG. 2 illustrates an IMS according to prior art.

6. The service request is routed to the originating user's S-CSCF based on route information learnt during registration. The S-CSCF 205 may invoke originating services by invoking one of its connected application servers 206 over ISC which is the interface between 205 and 206 in FIG. 2).

7. The originating S-CSCF uses the DNS to find the terminating operators I-CSCF based on the request URI. If the request URI is a private domain name based IMPU the DNS response will point on the operators own I-CSCF if the terminating user is served by this operator. If the terminating user is not handled by this operator the response will point the SIP request to the inter operator IMS network.

8. The established communication is terminated by the terminating functions according to standard IMS with function supporting multiple IMPU's in implicit registered identity sets.

Figure 5:
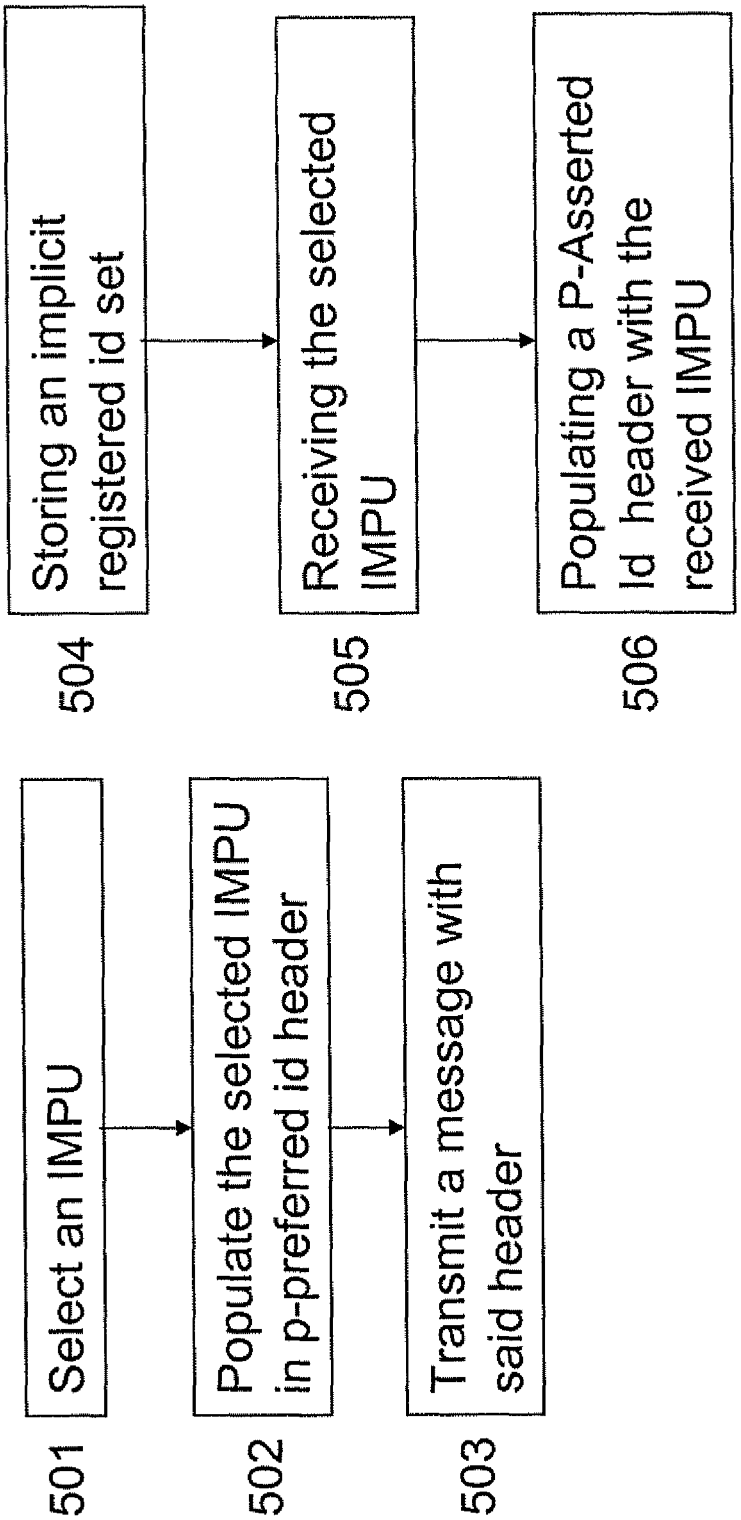
FIG. 5 illustrates schematically the methods according to an embodiment of the present invention.

Turning now to FIG. 5 illustrating schematically a method for the UE (5*a*) and a method for the P-CSCF (5*b*) in accordance with an embodiment according to the present invention.

The method for the UE comprises the steps of

501. Make it possible to select an IMPU, i.e. a private domain name based IMPU, from the implicit registered identity set of a user of the UE. The UE may e.g. be selected by the user or automatically by the UE, e.g. dependent on the communicating party.

502. Populate the selected IMPU in the P-preferred identity header.

503. Send an initial SIP message to the P-CSCF with the P-preferred identity header. According to an embodiment the From-field is also populated with said selected IMPU. The method for the P-CSCF comprises the steps of:

504. Storing an implicit registered identity set of the user of the UE.

505. Receiving the selected IMPU in a P-preferred identity header from the user.

506. Populating a P-Asserted identity header with the selected IMPU received in the P-preferred identity header.

Figure 6:
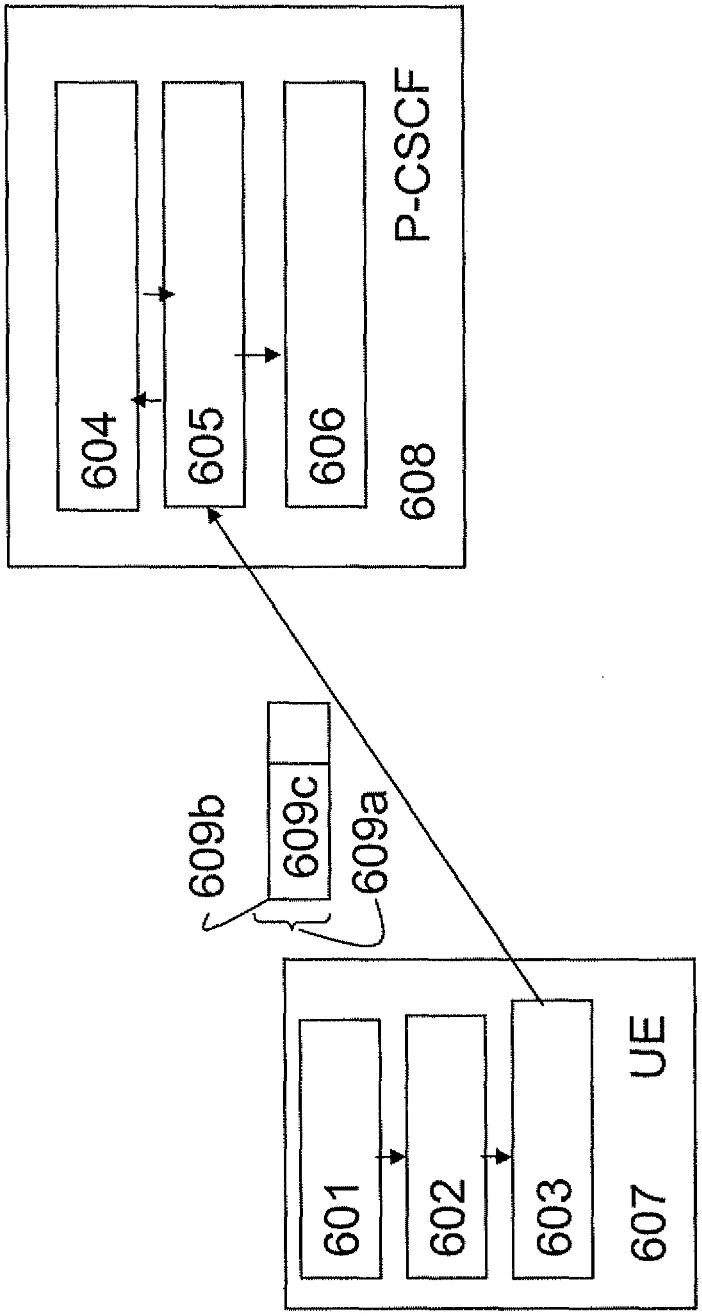
FIG. 6 illustrates schematically the arrangements according to an embodiment of the present invention.

Accordingly as illustrated in FIG. 6, the UE 607 comprises a selector 601 making it possible to select an IMPU. The selection may be made by the user or in automatically manner by the UE, e.g. depending on the party to be called or that is calling. The UE further comprises means 602 for populating the selected IMPU 609*c* in the P-preferred identity header and means 603 for transmitting a message 609*a* comprising said header 609*b*. The means 602 for populating the selected IMPU in the P-preferred identity header may also be adapted to populate the selected IMPU in the From field. According to one embodiment of the present invention, the P-CSCF 608 comprises storing means 604 configured to store the implicit registered identity set of the user of the UE. The P-CSCF further comprises means 605 for receiving the selected IMPU 609*c* in a P-preferred identity header 609*b* from the user and means 606 for populating a P-Asserted identity header with the selected IMPU received in the P-preferred identity header.

As explained above, by using the present invention it is possible to provide a private domain name based IMPU e.g. to a person "John" who is employed at a company A by an operator B. The operator domain name based address is denoted John@companyA.operatorB.com and an administrator at Company A creates the private domain name based IMPU John@companyA.net.

An advantage with the approach to associate the private domain name based IMPU with the operator domain name based IMPU is that the identity administration can be managed by the user. In addition, that relieves the pressure on the administration of the operator.

It should however be noted that the operator may provide the user "John" employed by company A with the identity John@companyA.net without using the operator domain name based identity. The approach of providing a private domain name based IMPU without an operator domain name based IMPU is referred to as provisioned private domain name based address and may be achieved by using the arrangement explained in conjunction with FIGS. 4*a*-4*e*. The provisioned private domain name based IMPU should preferable be made as a trusted identity as described above. Therefore the arrangement shown in FIGS. 4*a*-4*c* should comprise means for making the private domain name based identity into a trusted identity. Furthermore, the mechanisms of the UE 607 described in conjunction with FIG. 6 is not dependent on whether the private domain name based IMPU is coupled to an operator domain name based IMPU or if the private domain name based IMPU is provisioned.

It will be understood by those skilled in the art that various modifications and changes may be made to the present invention without departing from the scope thereof, which is defined by the appended claims.

The invention claimed is:

1. An arrangement for an Internet Multimedia Subsystem (IMS) configured to receive a message from a user equipment, wherein the user equipment is identified with an operator domain name based IP Multimedia Public Identity (IMPU), the arrangement comprising:

means for receiving a private domain name based IMPU selected by the user equipment from a plurality of identities of an implicit registered identity set of the user equipment stored in the user equipment, wherein the implicit registered identity set comprises a binding of the operator domain name based IMPU and the selected private domain name based IMPU;

storing means configured to store the implicit registered identity set of the user equipment;

means for receiving the selected private domain name based IMPU of the implicit registered identity set in a P-preferred identity header from the user equipment; and means for populating a P-asserted identity header with the selected private domain name based IMPU received in the P-preferred identity header.

2. The arrangement according to claim 1, further comprising means for making the selected private domain name based IMPU to a trusted identity.

3. The arrangement according to claim 1, wherein the arrangement is implemented in a Proxy-Call Session Control Function (P-CSCF) node.

4. A User Equipment (UE) connectable to an Internet Multimedia Subsystem (IMS), comprising:

a selector to select a private domain name based IP Multimedia Public Identity (IMPU) from a plurality of identities of an implicit registered identity set of the UE stored in the UE, wherein the implicit registered identity set comprises a binding of an operator domain name based IMPU and the selected private domain name based IMPU;

means for populating the selected private domain name based IMPU in a P-preferred identity header; and means for transmitting the selected private domain name based IMPU to a node of the IMS.

5. The UE according to claim 4, wherein the selected private domain name based IMPU is made to a trusted identity.

6. The UE according to claim 4, wherein the selector is configured to automatically select the selected private domain name based IMPU.

7. The UE according to claim 4, further comprising means for populating a From-field with the selected private domain name based IMPU.

8. The UE according to claim 4, wherein the selector is configured to select the selected private domain name based IMPU based on an identity of a communicating party.

9. A method for an Internet Multimedia Subsystem (IMS), comprising the steps of:

receiving a message from a user equipment, wherein the user equipment is identified with an operator domain name based IP Multimedia Public Identity (IMPU);

storing an implicit registered identity set of the user equipment;

receiving a private domain name based IMPU selected by the user equipment from a plurality of identities of the implicit registered identity set of the user equipment stored in the user equipment, wherein the implicit registered identity set comprises a binding of the operator domain name based IMPU and the selected private domain name based IMPU;

wherein the selected private domain name based IMPU of the implicit registered identity set is received in a P-preferred identity header from the user equipment; and populating a P-asserted identity header with the selected private domain name based IMPU received in the P-preferred identity header.

10. The method according to claim 9, wherein the selected private domain name based IMPU is made to a trusted identity.

11. The method according to claim 9, wherein the method is implemented in a Proxy-Call Session Control Function (P-CSCF) node.

12. A method for a User Equipment (UE) connectable to an Internet Multimedia Subsystem (IMS), comprising the steps of:

selecting a private domain name based IP Multimedia Public Identity (IMPU) from a plurality of identities of an implicit registered identity set of the UE stored in the UE, wherein the implicit registered identity set comprises a binding of an operator domain name based IMPU and the selected private domain name based IMPU;

populating the selected private domain name based IMPU in a P-preferred identity header; and transmitting the selected private domain name based IMPU to a node of the IMS.

13. The method according to claim 12, wherein the selected private domain name based IMPU is made to a trusted identity.

14. The method according to claim 12, wherein the step of selecting the private domain name based IMPU is performed automatically.

15. The method according to claim 12, further comprising the step of populating a From-field with the selected private domain name based IMPU before the transmitting step.

16. The method according to claim 12, wherein the step of selecting the private domain name based IMPU is based on an identity of a communicating party.

* * * * *